US005300160A

United States Patent [19]

Wilson et al.

[11] Patent Number: 5,300,160

[45] Date of Patent: Apr. 5, 1994

[54] LABEL TRANSFER DEVICE AND METHOD

[75] Inventors: Richard M. Wilson, Caldwell; Alton W. Hezeltine, Idaho City, both of Id.

[73] Assignee: Hewlett-Packard Company, Palo Alto, Calif.

[21] Appl. No.: 978,017

[22] Filed: Nov. 17, 1992

[51] Int. Cl.[5] .............................................. B32B 31/00

[52] U.S. Cl. ....................................... 156/64; 156/541; 156/542

[58] Field of Search ........................... 156/541, 542, 64

[56] References Cited

U.S. PATENT DOCUMENTS

| | | | |
|---|---|---|---|
| 3,324,508 | 6/1967 | Dickinson . | |
| 3,616,093 | 10/1971 | Teed | 156/571 |
| 4,293,365 | 10/1981 | Geyser et al. | 156/364 |
| 4,372,681 | 2/1983 | Sallenbach | 156/541 |
| 4,479,839 | 10/1984 | Tasma | 156/542 |
| 4,636,166 | 1/1987 | Franks et al. | 425/503 |
| 4,725,327 | 2/1988 | Matuda et al. | 156/351 |

FOREIGN PATENT DOCUMENTS

| | | |
|---|---|---|
| 2555910 | 6/1977 | Fed. Rep. of Germany . |
| 3233546 | 3/1984 | Fed. Rep. of Germany . |
| 3911050 | 10/1990 | Fed. Rep. of Germany . |

*Primary Examiner*—David A. Simmons
*Assistant Examiner*—William J. Matney, Jr.

[57] ABSTRACT

A label transfer device 10 having drive roller 26 and pinch roller 28 for advancing label tape 30, positioning a label attached to label tape 30 adjacent to stripping edge 24 of slidable stripping plate 18 and holding said label fixed in that position while stripping plate 18 is retracted from a first position to a second position so as to strip the label from label tape 30. Vacuum pick up head 38 is provided for attachment to the stationary label prior to the movement of stripping plate 18 so as to ensure positive attachment to prior to label stripping and thus eliminating label transfer skips.

14 Claims, 8 Drawing Sheets

LABEL TRANSFER DEVICE AND METHOD

BACKGROUND OF THE INVENTION

1. Technical Field

This invention relates to a label transfer device for stripping labels from a label tape prior to placement upon a product, and more particularly to a label transfer device wherein the label tape is held in a fixed position, a movable transfer arm is positioned and attaches to the label prior to its being removed from the label tape, and the stripping plate moves instead of the label tape as the label is stripped from the tape.

2. Background Art

In today's commercial labeling applications, labels are typically provided in rolls, wherein the individual labels are pre-printed on one surface and provided with an adhesive on the opposite surface. The labels are pre-positioned on a label tape, ribbon, or webbing, sometimes called a release liner, for example, waxed paper ribbon, to which the label will adhere with a relatively low adhesive force so that the label can be easily peeled from the ribbon prior to placement on a package or product. Typically, the label material is paper or a plastic such as nylon, polypropylene, polyester or a polyamide, the label tape or ribbon is waxed paper or plastic and the adhesive is selected for its adhesion characteristics both for holding on the product or packaging and for a relatively low adhesion to the release liner or label tape.

Labels are peeled from the release liner or label tape by use of a process which is common to any type of label removal, whether it be by machine or by hand. In the consumer market, blank labels usually accompany blank, unrecorded audio or video tape cassettes. These labels are initially affixed to a label tape or backing which has a waxed or plastic surface. In order to remove the label, the backing is bent away from the more rigid label so as to form a small radius shear line between the rigid label and the more pliable backing. The label can then be peeled off along the shear line by pulling the backing and the label away from each other.

In commercial applications, the same concept is used to remove labels from a release liner or label tape. FIGS. 1A and 1B demonstrate the prior art process in conceptual format. In FIG. 1A there is shown a flat stripping plate and stripping roller. The labels and tape are passed over the top surface of the stripping plate and then over and around a stripping edge of the stripping plate and then around the stripping roller. The label, being relatively rigid, or inflexible, is attached to the more flexible label tape. The adhesive force of the glue on the label, holding the label to the tape, is less than the force necessary to bend the rigid label around the stripping edge radius, and as a result the label, as shown in FIG. 1A, peels off extending out from the stripping plate as the more pliable label tape bends around the stripping edge of the stripping plate, thereby separating the label from the label tape.

The problem is that the label, although being fairly rigid, is still flexible, and in the case of long, thin labels, for example, uniform product bar code labels, will bend or twist under their own weight as they are stripped off of the label tape as is shown in FIG. 1B.

A pick up head or transfer device, typically a pick up head which draws a vacuum to suck and hold the label up against a vacuum screen, is provided to capture the label as it is being stripped off the label tape. The vacuum head is typically part of a mechanical system which, and once it has captured the label, is used to reposition it for placement upon the product or packaging.

The prior art can generally be described as having all of its mechanical pieces stationary relative to each other with a moving label tape which passes over the stationary stripping plate, down around the stripping edge with the labels being stripped off and extending out away from the tape into a position where, hopefully, they can be captured by the vacuum head. It is not the most reliable of systems, especially if it is being used in conjunction with bar code labels which are long, thin and flexible. There will be vacuum head capture misses which will result in label skips unless the production line is temporarily shut down to correct the problem.

To minimize these problems, the prior art has normally oriented the stripping plate such that there is a gravity assist to the free swinging labels that are being stripped off the tape. As a result, a label is vertically oriented at the time that the vacuum head attaches itself to the label, thus requiring the mechanical or robotic arm to rotate from a vertical orientation to capture the label, to a horizontal orientation for placement of the label on a horizontally oriented product or package surface.

Another problem with the prior art, particularly with long, thin labels, such as bar code labels, is label curling as the label is being stripped from the webbing or tape. This is shown in prior art FIG. 1B. To minimize curling, prior art labels are thicker than would necessarily be required if they could be removed from the label tape without curling. Thinner labels are less expensive, and as a general rule, there is a trade off in the prior art between the curling of thinner labels and the expense of thicker labels. This usually results in a compromise wherein some pickup and placement misses due to label curling are permitted to occur in order to save the expense of the more expensive, thicker and stiffer labels.

Another problem with the prior art is that every label must be stripped from the label tape and picked up by the vacuum head. Ideally a label transfer machine such as disclosed in the present invention is capable of sensing defective labels and skipping them, allowing them to remain on the scrap label tape.

Accordingly, what is needed is a label transfer device wherein the pick up head positively attaches to the label prior to its being stripped from the label tape so as to eliminate curling and bending of stripped labels as the label tape passes over and bends around the stripping edge of the stripping plate, thus enabling the use of thinner, more flexible labels. Another object of the present invention is a positive attachment between the vacuum head and the label prior to its being stripped such that the stripping action is not gravity dependent, but rather can be accomplished in any orientation, including upside down, wherein the label is stripped from underneath the label tape, so that the placement or robotic mechanism need not always operate in both a vertical and horizontal orientation.

Another object of the present invention is to provide a sensor capable of sensing defective labels and a control mechanism for skipping them on the tape, allowing them to remain with the scrap label tape. A final object of the present invention is to provide a vacuum head pick up of the label prior to its being stripped from the label tape so that the pickup is more accurate, resulting in more accurate label placement on the product or packaging materials.

DISCLOSURE OF INVENTION

These objects are accomplished by use of a label transfer device which utilizes an intermittent label tape advancing drive system to pull a label tape, containing attached labels, into a scanning position wherein each label is scanned to determine its accuracy for use, and then to a stripping position atop a stripping plate, where it is in position for attachment to a movable vacuum head, and subsequent stripping from the label tape.

The vacuum head of the transfer arm is positioned atop the label, and a vacuum is drawn so as to provide a holding force between the label and the vacuum head prior to any stripping action. Next, rather than have the label advance with the label tape being stripped away from the label, the label remains stationary relative to the vacuum head, and the stripping plate assembly is retracted rearwardly relative to the label tape, stripping off the label tape from the label, while the label remains in a fixed position relative to the vacuum head.

The label remains attached, by vacuum, to the vacuum head during the stripping process, since it remains motionless relative to the vacuum head, as the movable stripping assembly strips away the backing tape. Once the label has been stripped from the label tape, the vacuum head and attached label are withdrawn and repositioned for placement of the label on the product or packaging. The stripping plate is then reset to its first stripping position, and the remainder of the label tape is advanced to the first inspection position and then on to the second stripping position for stripping of the next label from the tape.

BEST MODE FOR CARRYING OUT INVENTION

Referring to FIGS. 2 through 6, there is shown, in schematic representational format, label transfer device 10 having moving or retractable stripping plate 18 for stripping labels wherein the label remains stationary relative to vacuum head pickup device 38.

Figure 1A:
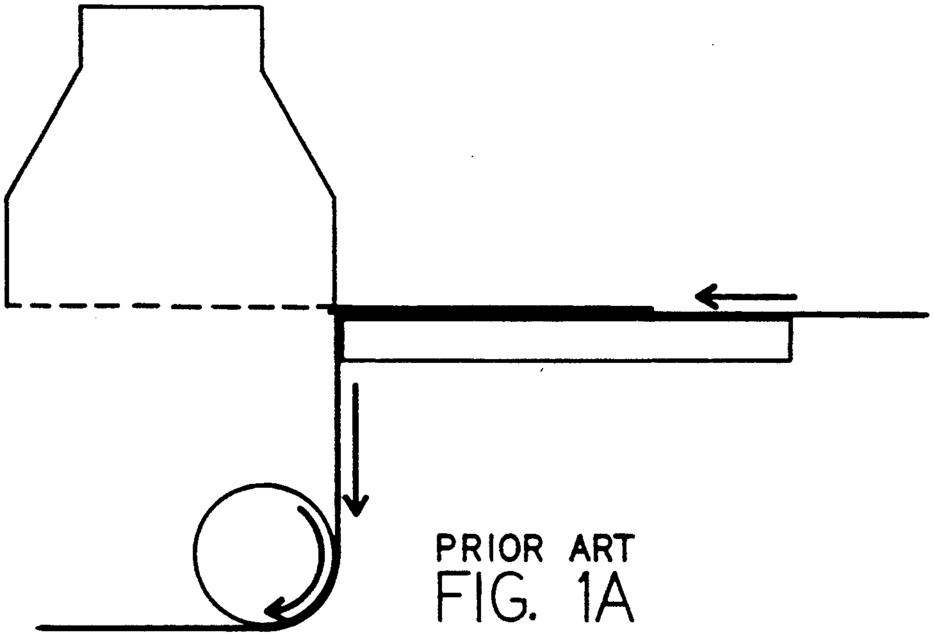
PRIOR ART FIG. 1A
FIG. 1A is a schematic representation of a prior art stripping plate and label tape.
Figure 1B:
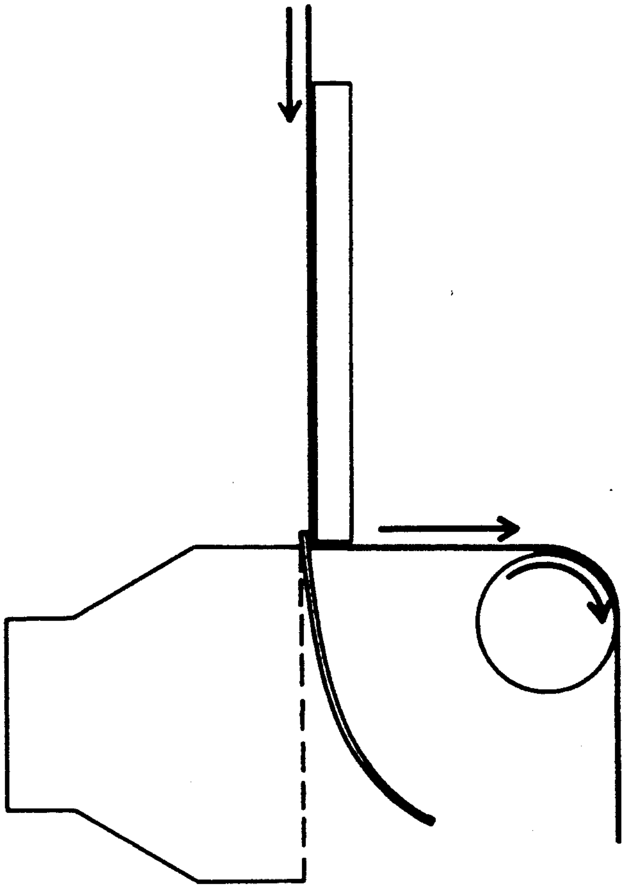
PRIOR ART FIG. 1B
FIG. 1B is a representation of a prior art stripping plate assembly and label tape wherein a stripped label is curled.
Figure 2:
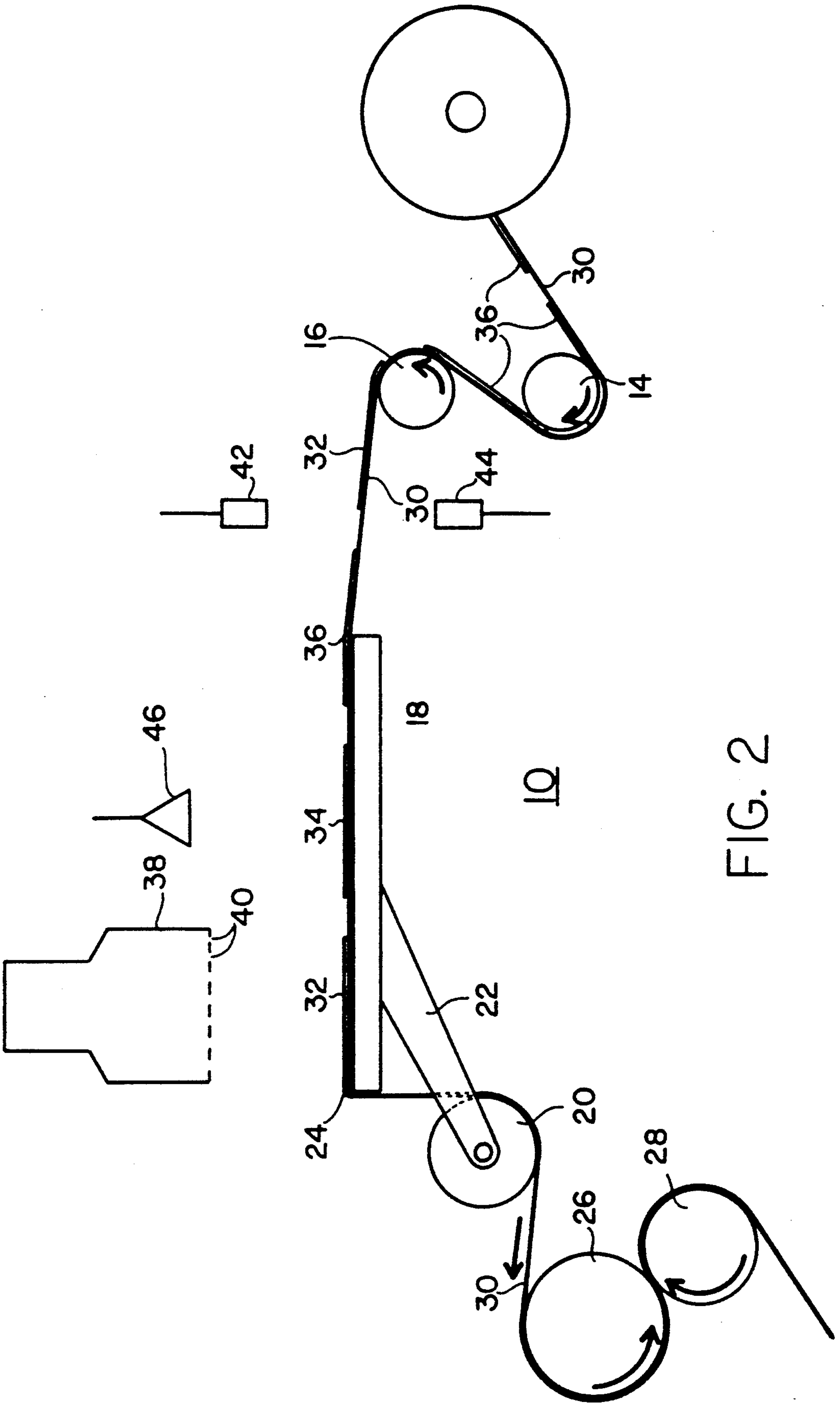
FIG. 2 is a schematic representation of the label transfer device wherein the label tape has been advanced to position a first label in a stripping position and a second label in an inspection position.

As shown in FIG. 2, label tape 30, having attached labels 36, is drawn from label tape reel 12 around idler rollers 14 and 16, and onto the top surface of stripping plate 18. Idler rollers 14 and 16 serve to align the label tape with stripping plate 18 regardless of whether label tape 30 is wound clockwise or counterclockwise on label reel 12. A second function is to position label tape 30 in elevated planar relation to the top surface of stripping plate 18, so as to facilitate the retraction of stripping plate 18 against label tape 30 when it is held fixed during operation of label transfer device 10. As can be seen representationally in FIG. 2, labels 36 are attached to label tape 30 by means of an adhesive having sufficient adhesive force to hold the labels attached during the relatively large radial turns around idler rollers 14 and 16.

In FIG. 2, stripping plate 18 is positioned in its first position whereby label 34 is positioned adjacent to optical scanner 46 which is utilized, in a conventional manner, to determine the accuracy or acceptability of the label. If the printed material of label 34 were to be defective, it would be sensed by optical scanner 46, and the label would be skipped in the operation of label transfer device 10 by advancing it past the stripping edge without first attaching vacuum head 38 to the defective label. The defective label will still strip off as label tape 30 is drawn over and around stripping edge 24, but it will either fall back onto and reattach to label tape 30 or fall away from label transfer device 10 depending upon the orientation of device 10.

In this first position label 32 is positioned for eventual attachment to vacuum head 38. In the preferred embodiment this is accomplished by use of optical sensor 42 in combination with optical sensor receiver 44 which senses the position of labels 36 on label tape 30 as it is being advanced between label transfers. The combination of optical sensor 42 and sensor receiver 44 is an optical see through device which senses the presence of an edge of a non-transparent label on a somewhat transparent tape. It should be apparent to those skilled in the art that many other types of sensing devices would also work, including reflective, infared and inductive sensors amongst others. In a like manner, the preferred embodiment employs the use of a vacuum head 38 as a label pickup or transfer device. In the preferred embodiment vacuum head 38 draws a vacuum through screen openings 40 and provides a positive attachment means between vacuum head 38 and label 32.

In the preferred embodiment, label transfer device 10 is used for positioning bar code labels for transfer to printed circuit boards. However, label transfer device 10 could be used for transferring labels from label tape 30 to virtually any product or packaging material. There are a number of various attachment devices which could serve the same function as vacuum head 38, for example pick up heads bearing a static charge or mechanical pick up heads. A vacuum head is provided in the preferred embodiment because of the printed circuit board product, in lieu of a static or electrical charge heads since the use of a static or electrical charge pick up head for placement of labels on a printed circuit board is likely to cause electrostatic damage to the board or to components on the board.

Attached to stripping plate 18 by means of attachment bracket 22 is stripping roller 20 which is positioned in fixed relationship to stripping plate 18, so as to provide a vertical tangent coincident to stripping edge 24 of stripping plate 18. In practice it has been found that stripping edge 24 is not a knife sharp edge, but rather has a small radius in the range of 0.005 inches to 0.030 inches. A sharper edge can result in cutting of label tape 30. A larger radius edge reduces the shear force, and in the case of thin ductile labels, can actually result in the adhesion force between the label tape and the label at the intended shear line remaining greater than the force required to bend the label, thus resulting in the label remaining adhered to the tape and bending around shear edge 24 instead of stripping away. With these relatively sharp radiuses, the adhesive force at shear edge 24 is less than the force required to bend the label, resulting in the label shearing from the tape as the shearing plate 18 is retracted.

Finally, drive roller 26 and pinch roller 28 are provided to intermittently advance label tape 30 as required during operation of label transfer device 10.

Figure 3:
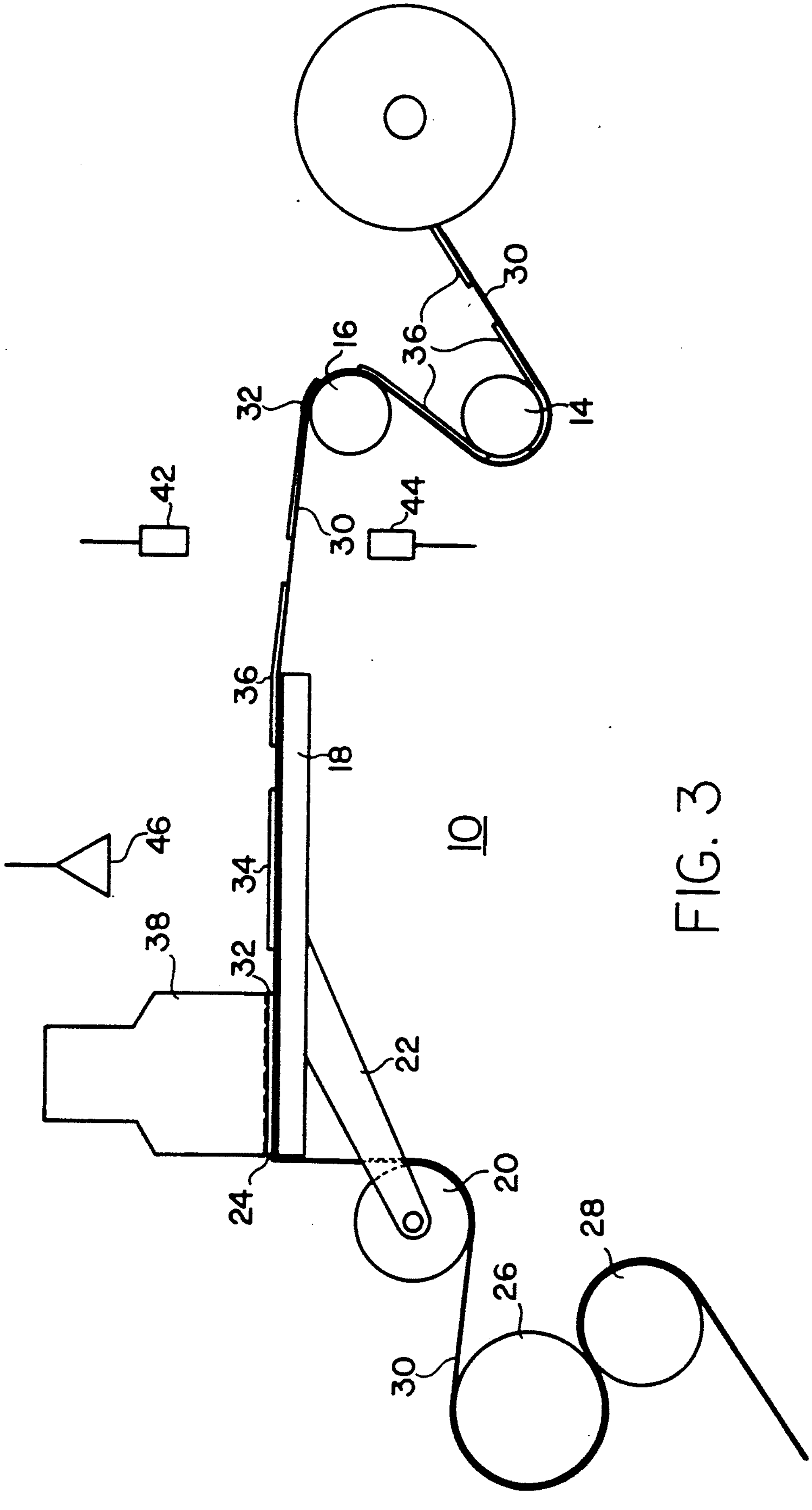
FIG. 3 is a schematic representation of the label transfer device wherein a vacuum pickup head has been attached to the label in the stripping position.

In FIG. 3, vacuum head 38 has been lowered down into position atop label 32 in preparation for the shearing operation of stripping plate 18. The label tape 30 is held in a fixed position and does not again advance until the stripping operation is completed. There are a number of ways of sensing or detecting the attachment of vacuum head 38 to a label including optical, mechanical or a change in vacuum pressure. The method used in the preferred embodiment utilizes a change in vacuum pressure, namely an increase in the vacuum which occurs when the apertures of vacuum screen 40 are temporarily sealed off by contact of the label with the screen. Similarly, the same type of vacuum detector can be used to confirm proper alignment and attachment of vacuum head 38 to label 32 if label 32 is gas impermeable and label tape 30 is not.

Figure 4:
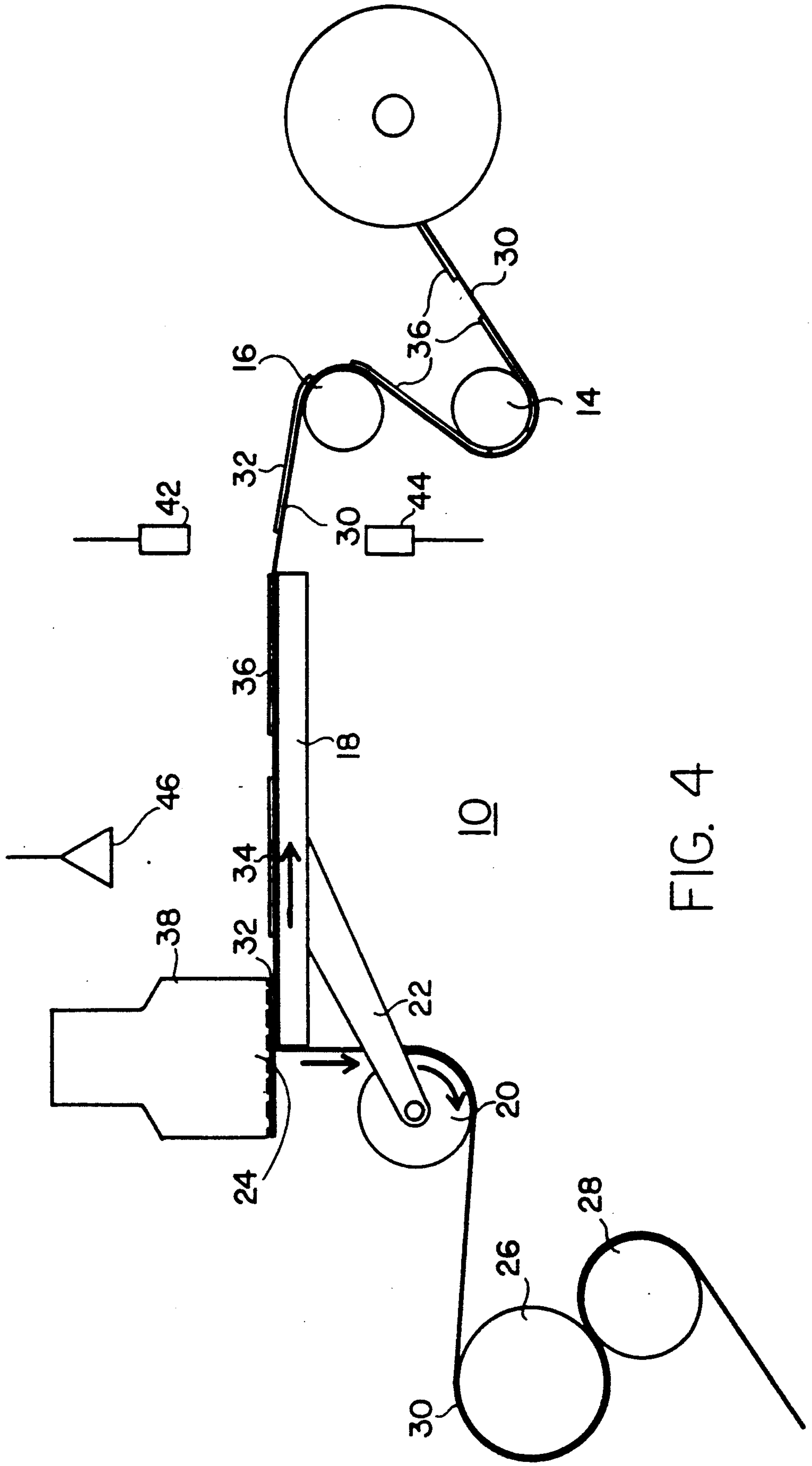
FIG. 4 is a schematic representation of the label transfer device showing the movable stripping plate partially retracted and a label being stripped from the label tape.

In FIG. 4, as can be seen, stripping plate 18 is partially retracted, with empty label tape 30 being drawn down around stripping roller 20, with label 32 remaining attached to vacuum head 38, thus eliminating curling, bending, or any other relative displacement of label 32 with regard to vacuum head 38.

Figure 5:
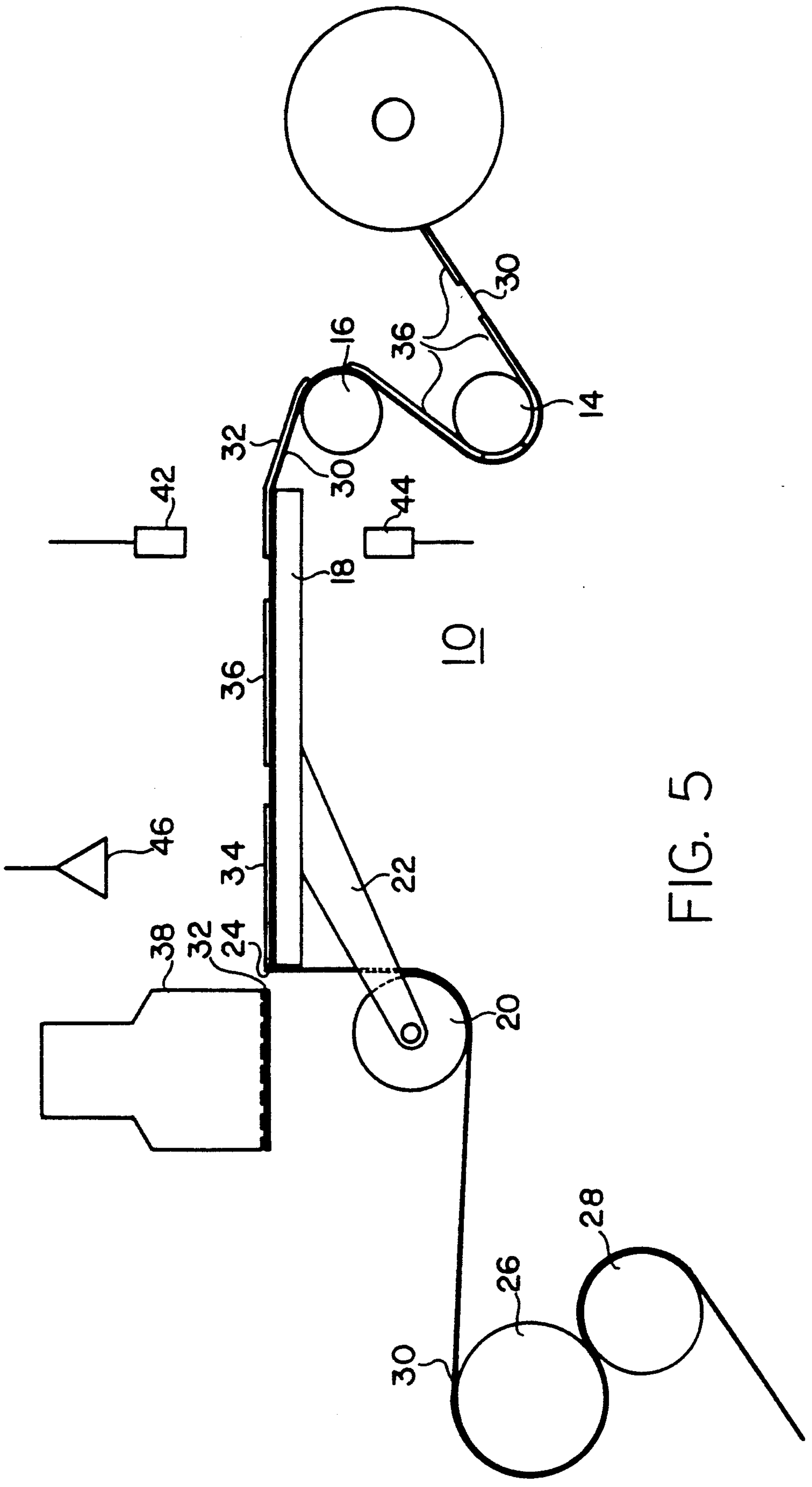
FIG. 5 is a schematic representation of the label transfer device showing the movable stripping plate in a fully retracted position, with a stripper label attached to a vacuum head.
Figure 6:
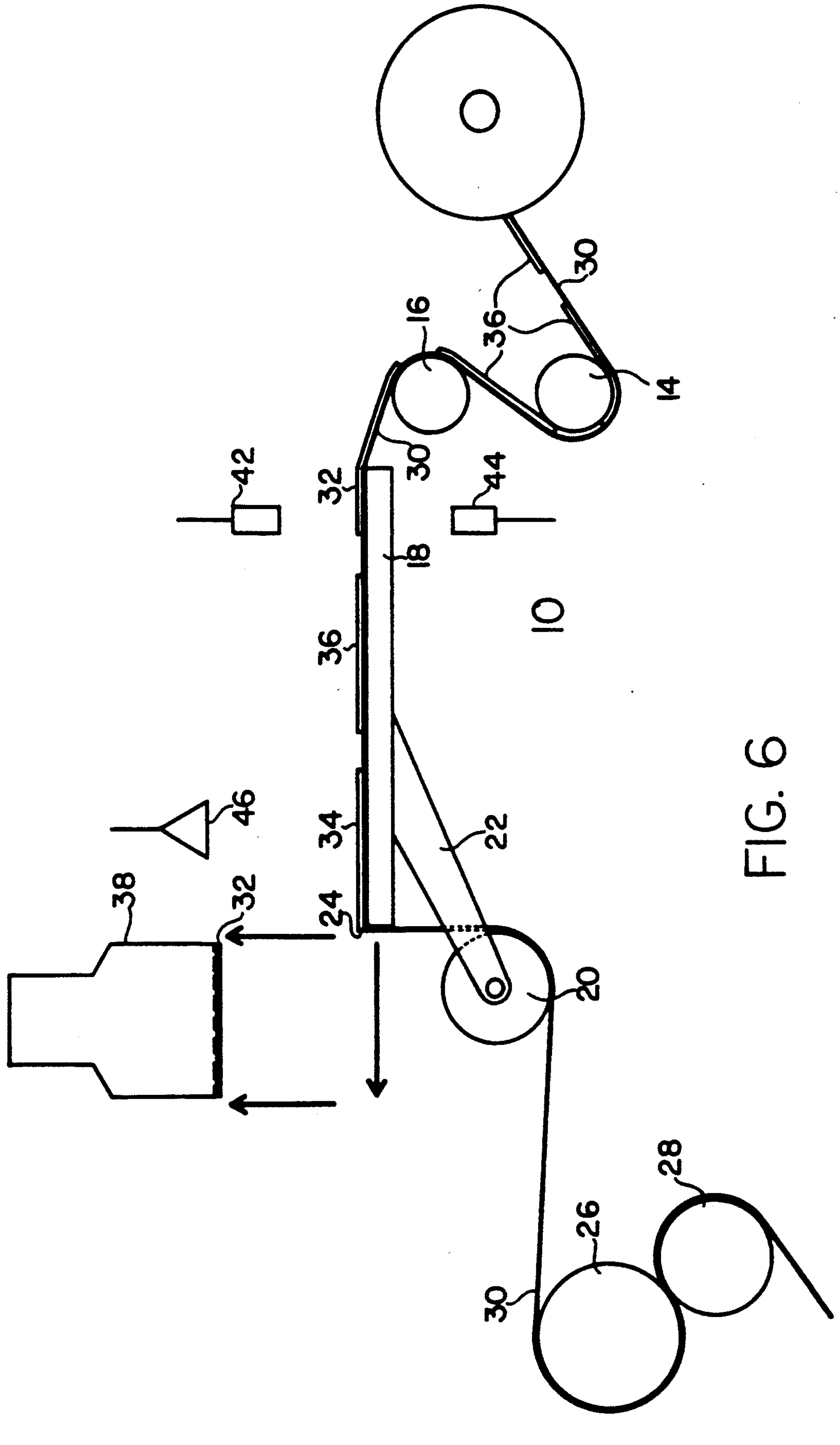
FIG. 6 is a schematic representation of the label transfer device showing the stripped label being removed from the label transfer device.

In FIG. 5, stripping plate 18 has been completely retracted, and thus separated from label 32 and in FIG. 6 the cycle of operation is completed with vacuum head 38 withdrawing with label 32, and stripping plate 38 beginning to reset to its first position. After reset, drive roller 26 and pinch roller 28 operate to advance label tape 30 to position the next label in the stripping position for initiation of the next label removal cycle.

Figure 7:
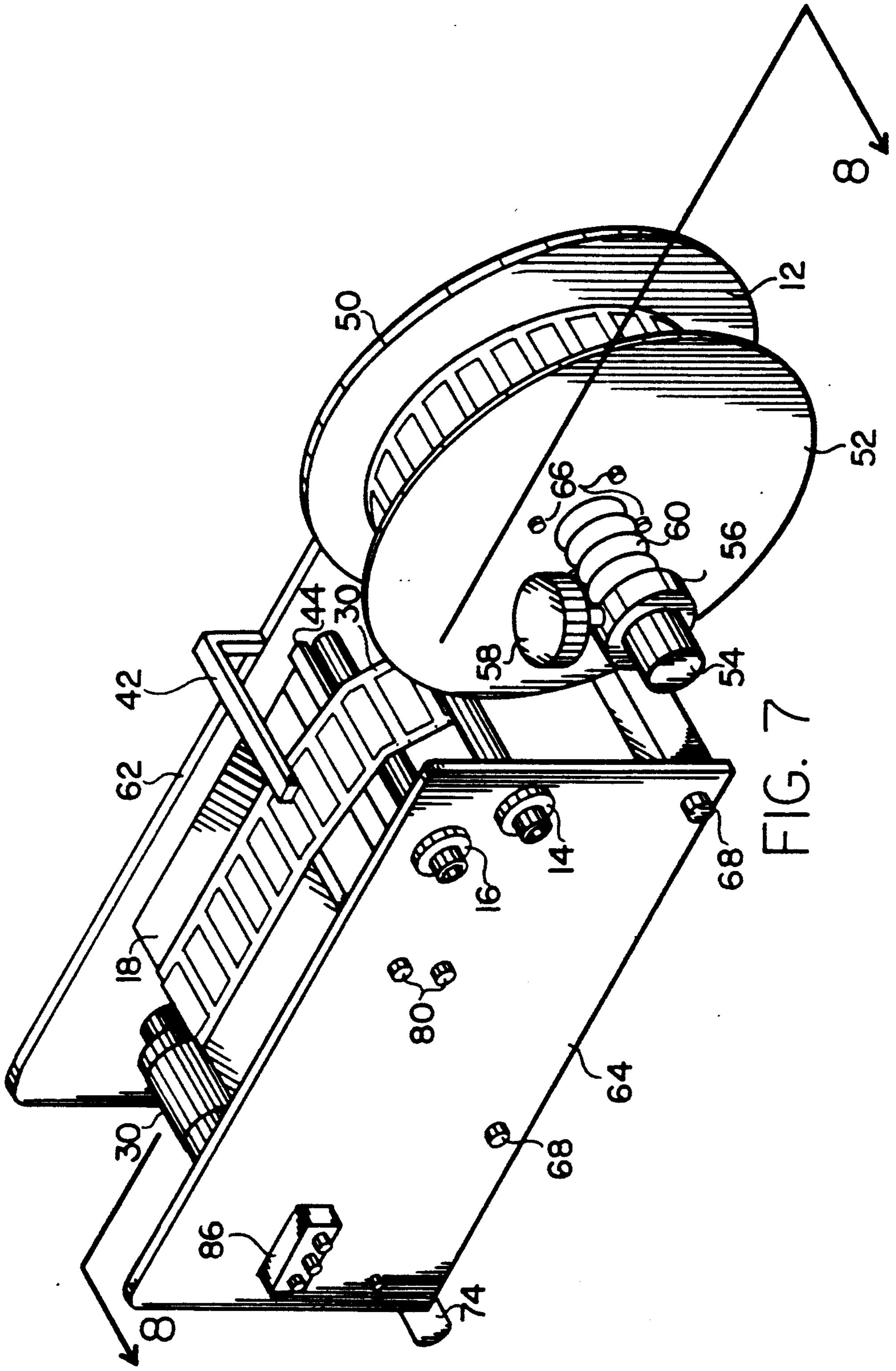
FIG. 7 is perspective representational view of the label transfer device.

The present invention has some distinct advantages over the prior art, the primary one being that the vacuum head 38 attaches to the label while the label is still fully adhered to label tape 30. This is of particular importance in that it eliminates any misalignments caused by curling, bending or twisting of labels if they are sheared from label tape 30 prior to attachment to vacuum head 38. In addition, this enables the use of thinner labels where, without the pre-shearing attachment to vacuum head 38, curling, bending or twisting would most assuredly occur. Thus, thinner, less expensive labels can be used, and at the same time there is an increase in the accuracy and reliability of the alignment of the label to the vacuum head. Additionally, as shown in FIG. 7, the label tape used with the present invention has transversely aligned labels adhered thereto which reduces fabrication costs of the full label tapes. This is unlike the prior art, wherein the labels are longitudinally aligned on a long, thinner tape, to facilitate the pre-attachment shearing over a fixed stripping plate.

In addition to the savings and improved alignment accuracy, the positive attachment between vacuum head 38 and label 32 eliminates gravity dependency of the labeling device. It is no longer necessary to strip the label downward so as to minimize curling, bending or twisting, since there is positive contact between the label and the vacuum head prior to stripping. Thus, the orientation of the transfer arm and vacuum head placement become irrelevant to effective operation of label transferring device 10 in that shearing can occur in any orientation, including upside down. This, in turn, simplifies installation in that an upside down orientation can be used for placement of labels on the bottom of a product or package without first flipping the product or the package over.

Figure 8:
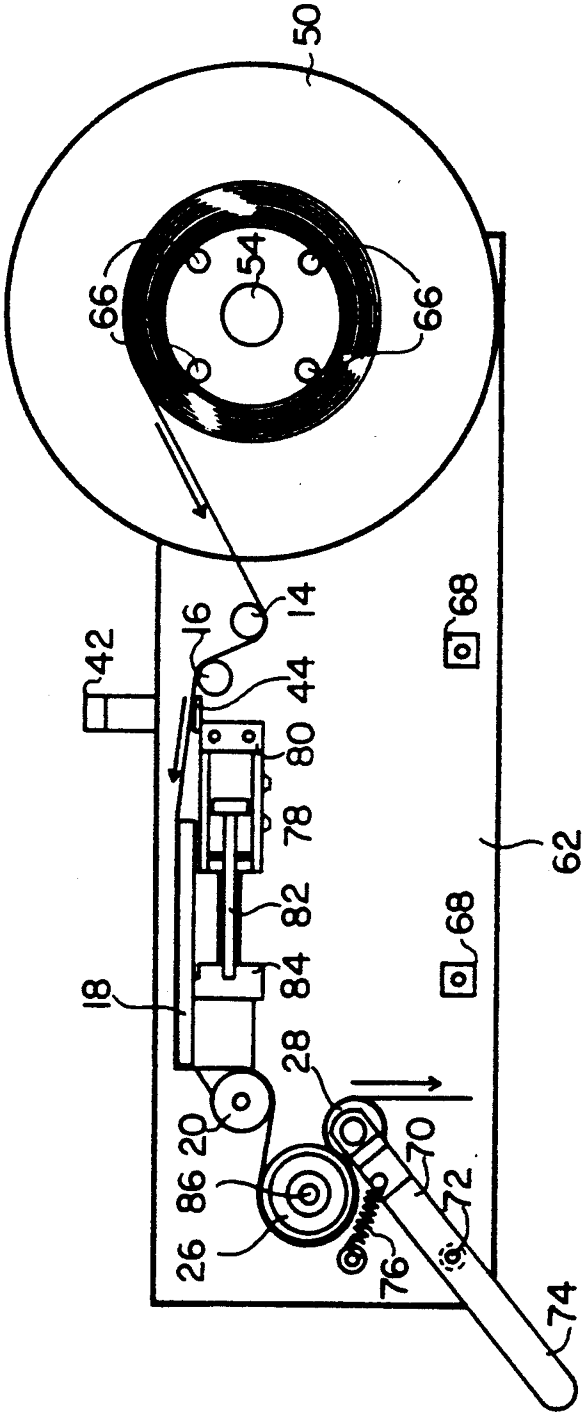
FIG. 8 is sectional side view of the label transfer device.

The actual preferred embodiment of label transfer device 10 is shown in greater detail in FIGS. 7 and 8. As can be seen in FIG. 7, label reel 12 is formed of reel plate 50 and removable reel plate 52 held on rotatable reel shaft 54. A tensioning feature is provided in the form of tensioning spring 60 which is held in adjustable compression between removable reel plate 52 and lock ring 56 by means of lock screw 58. Spool guide pins 66 are also provided and serve to center spools of label tape having differing spool shaft sizes. Back tensioning is required to insure that label tape 30 remains taut against stripping plate 18 and will draw tautly over and around stripping edge 24 when stripping plate 18 is retracted from its first position at the beginning of the stripping operation to the second position at the completion of the stripping operation. The amount of back tension is dependent upon a number of factors, including label tape material, the size of the label and the material that the label is formed of, hence the amount of back tension is empirically determined by trial and error manual adjustment of lock ring 56 against spring 60. Usually the amount of back tension required to hold a typical label tape taut over and around stripping edge 24 is several pounds.

Drive roller 26 is, in the preferred embodiment, driven by an electric motor, not shown, through a gear reduction and chain drive assembly, also not shown. These are well known in the art and all that is required is that the power drive assembly for drive roller 26 have sufficient power to overcome the required back tension provided by label reel 12, and further that it have minimum coast down roll after label tape advance. In addition, unidirectional drive roller support bearings 86 are provided to permit rotation of drive roller 26 in one direction only, that is to advance label tape 30, and to prevent rotation of drive roller 26 in the reverse direction. This is required in order to hold label tape 30 stationary during the stripping operation when stripping plate 18 is being retracted from the first position to the second position. Without the ability to hold label tape 30 firmly in a stationary position, it would pull back along with stripping plate 18 and no label stripping action would occur.

Pinch roller 28 is rotatably mounted to pivot arm 70 which is rotatable around pivot pin 72 which itself is attached to first and second frame member 62 and 64. The tensional force of spring 76 holds pinch roller 28 in elemental compression against drive roller 26 and label tape 30 to complete the drive mechanism. Pinch roller release handle 74 extends from pivot arm 70 to provide a mechanical release for pinch roller 28 when threading a new label tape into the transfer device.

Motive power for stripping plate 18 is provided by dual action air cylinder 78 which is attached to frame members 62 and 64 by means of air cylinder attachment bracket 80 and to stripping plate 18 by stripping plate attachment bracket 84. In the preferred embodiment, air cylinder shaft 82 has an adjustable throw to accommodate various sized labels. Air lines and the air cylinder control systems are not shown and are of conventional design and well known in the art. In addition, it should be apparent to those skilled in the art that a number of alternative means to provide motive power for the stripping plate are readily available and include hydraulic and mechanical systems amongst others.

As can be seen in the drawings, and particularly in FIG. 7, idler rollers 14 and 16, as well as drive roller 26 are all transversely oriented relative to the longitudinal axis and the direction of movement of stripping plate 18. They are attached by means of bearing assemblies, conventional bearings in the case of idler rollers 14 and 16, and unidirectional in the case of drive roller, to frame members 62 and 64. Frame cross members 68 also attach to frame members 62 and 64 to provide structural rigidity to the complete assembly.

While there is shown and described the present preferred embodiment of the invention, it is to be distinctly understood that this invention is not limited thereto but may be variously embodied to practice within the scope of the following claims.

We claim:

1. A label transfer device for transferring labels having printed information on one surface and an adhesive on the other surface, from a label tape ribbon having a having a leading end, a trailing end and, a plurality of labels adhered seriatim thereto, to a transfer device for repositioning and placement of a label on a product or package, which comprises:

- a frame;
- a stripping plate having a first surface and a longitudinal axis slidably attached to said frame and capable of being slid along said longitudinal axis from a first position to a second position, said stripping plate further having a transverse stripping edge at one end of said plate;
- means for positioning a label tape having a label attached thereto adjacent to the first surface of the stripping plate;
- means for drawing and holding the leading end of the label tape over and around the stripping edge;
- means for advancing the label tape across the first surface of the stripping plate;
- means for positioning a label attached to the label tape in a stripping position adjacent to the stripping edge of the stripping plate when the stripping plate is in the first position;
- means for holding both the leading end and the trailing end of the label tape fixed when a label attached to the label tape is positioned in the stripping position and when the stripping plate is slid from the first position to the second position;
- attachment and transfer means for selectable attachment to the label when it is held fixed in its stripping position;
- means for sliding the stripping plate from the first position to the second position so as to strip from the label tape a label held fixed in its stripping position and selectably attached to the attachment and transfer means.

2. The label transfer device of claim 1 wherein said means for positioning a label attached to the label tape in a stripping position adjacent to the stripping edge of the stripping plate when the stripping plate is in the first position further comprises sensing means for detecting the presence of a label on the label tape at a predetermined position.

3. The label transfer device of claim 1 which further comprises optical scanning means for verifying accuracy of printed information on a label prior to attachment of said attachment and transfer means to said label.

4. The apparatus of claim 3 wherein said optical scanning means is a uniform product bar code reader.

5. The label transfer device of claim 1 wherein the means for drawing and holding the leading end of the label over and around the stripping edge further comprises:

- a stripping roller having a longitudinal axis and a cylindrical outer surface;
- means for rotatably holding said stripping roller in a position wherein a plane tangent to an elemental line along the surface of the stripping roller is generally normal to the first surface of the stripping plate and intersects and is coincident to the transverse stripping edge of said stripping plate.

6. The label transfer device of claim 1 wherein the means for advancing the label tape across the first surface of the stripping plate, positioning a label attached to the label tape in a stripping position adjacent to the stripping edge of the stripping plate when the stripping plate is in the first position, and holding the leading end of the label tape fixed in that position when the stripping plate is slid from the first position to the second position further comprises:

- a drive roller rotatably mounted to the frame in an orientation wherein its longitudinal axis is parallel to the transverse stripping edge;
- a cylindrical pinch roller having its longitudinal axis parallel to the axis of the drive roller and adjustably held in compressive elemental engagement with the surface of the drive roller;
- means for selectively rotating the drive roller;
- means for driving the drive roller in one direction;
- means for prohibiting rotation of the drive roller in the opposite direction to that in which it is driven.

7. The label transfer device of claim 1 wherein said attachment and transfer means further comprises a vacuum pick up head.

8. The label transfer device of claim 7 wherein the vacuum pick up head further comprises a pick up surface having a plurality of apertures therethrough which are temporarily blocked when brought into engagement with an air impermeable label.

9. The label transfer device of claim 1 wherein the means for sliding the stripping plate from the first position to the second position is a pneumatic cylinder attached to said stripping plate.

10. The label transfer device of claim 5 wherein the means for advancing the label tape across the first surface of the stripping plate, positioning a label attached to the label tape in a stripping position adjacent to the stripping edge of the stripping plate when the stripping plate is in the first position, and holding the leading end of the label tape fixed in that position when the stripping plate is slid from the first position to the second position further comprises:

a drive roller rotatably mounted to the frame in an orientation wherein its longitudinal axis is parallel to the transverse stripping edge;

a cylindrical pinch roller having its longitudinal axis parallel to the axis of the drive roller and adjustably held in compressive elemental engagement with the surface of the drive roller;

means for selectively rotating the drive roller;

means for driving the drive roller in one direction;

means for prohibiting rotation of the drive roller in the opposite direction to that in which it is driven.

11. The label transfer device of claim 10 wherein said attachement and transfer means further comprises a vacuum pick up head.

12. The label transfer device of claim 11 wherein the vacuum pick up head further comprises a pick up surface having a plurality of apertures therethrough which are temporarily blocked when brought into engagement with an air impermeable label.

13. The label transfer device of claim 11 wherein the means for sliding the stripping plate from the first position to the second position is a pneumatic cylinder attached to said stripping plate.

14. In a label transfer device having a frame, a stripping plate having a first surface and a longitudinal axis slidably attached to said frame and capable of being slid along said longitudinal axis from a first position to a second position, said stripping plate further having a transverse stripping edge at one end of said plate, means for positioning a label tape having a leading end and a trailing end and a label attached thereto adjacent to the first surface of the stripping plate, means for drawing and holding the leading end of the label tape over and around the stripping edge, means for advancing the label tape across the first surface of the stripping plate, means for positioning a label attached to the label tape in a stripping position adjacent to the stripping edge of the stripping plate when the stripping plate is in the first position, means for holding both the leading and trailing ends of the label tape fixed when a label attached to the label tape is positioned in the stripping position and when the stripping plate is slid from the first position to the second position, attachement and transfer means for selectable attachment to the label when it is held fixed in its stripping position, means for sliding the stripping plate from the first position to the second position so as to strip from the label tape a label held fixed in its stripping position and selectably attached to the attachment and transfer means, a method of removing a label from a label tape which comprises:

positioning a label tape having a label attached thereto adjacent to the first surface of a stripping plate;

advancing the label tape across the first surface of the stripping plate;

positioning the label attached to the label tape adjacent to the stripping edge of the stripping plate when the stripping plate is in a first position;

holding both the leading and trailing ends of the label tape fixed with the positioned label in the stripping position;

attaching an attachment and transfer means to said label when held fixed in the stripping position; and sliding the stripping plate from the first position to a second position so as to strip from the label tape the label held fixed in a stripping position and attached to the attachment and transfer means.

* * * * *